(12) United States Patent
Le Gallo et al.

(10) Patent No.: US 8,500,971 B2
(45) Date of Patent: Aug. 6, 2013

(54) HIGH TEMPERATURE ELECTROLYSER WITH TEMPERATURE HOMOGENISATION DEVICE

(75) Inventors: Patrick Le Gallo, Saint Appolinard (FR); Pierre Baurens, Roybon (FR)

(73) Assignee: Commissariat a l'Energie Atomique, Paris (FR)

(*) Notice: Subject to any disclaimer, the term of this patent is extended or adjusted under 35 U.S.C. 154(b) by 383 days.

(21) Appl. No.: 12/678,313

(22) PCT Filed: Sep. 23, 2008

(86) PCT No.: PCT/EP2008/062650
§ 371 (c)(1),
(2), (4) Date: Mar. 16, 2010

(87) PCT Pub. No.: WO2009/040335
PCT Pub. Date: Apr. 2, 2009

(65) Prior Publication Data
US 2010/0200422 A1  Aug. 12, 2010

(30) Foreign Application Priority Data
Sep. 25, 2007 (FR) ..................................... 07 57822

(51) Int. Cl.
*C25B 9/08* (2006.01)
*C25B 1/04* (2006.01)

(52) U.S. Cl.
USPC .......................................... 204/258; 205/628

(58) Field of Classification Search
USPC ......................................... 204/258; 205/628
See application file for complete search history.

(56) References Cited

U.S. PATENT DOCUMENTS

| | | | |
|---|---|---|---|
| 7,632,593 B2 * | 12/2009 | Carter et al. | 429/457 |
| 8,317,986 B2 * | 11/2012 | Le Gallo | 204/258 |
| 2004/0229099 A1 | 11/2004 | Standke et al. | |
| 2007/0163889 A1 | 7/2007 | Kato et al. | |
| 2007/0287047 A1 * | 12/2007 | Kaiser et al. | 429/26 |
| 2008/0145740 A1 * | 6/2008 | Blein | 429/34 |
| 2013/0032490 A1 | 2/2013 | Le Gallo et al. | |

FOREIGN PATENT DOCUMENTS

| | | |
|---|---|---|
| DE | 100 15 360 A1 | 10/2001 |
| EP | 1 465 278 A2 | 10/2004 |
| EP | 1 465 278 A3 | 10/2004 |
| WO | WO 2006/053727 A2 | 5/2006 |

OTHER PUBLICATIONS

W. Doenitz, et al., "Concepts and Design for Scaling Up High Temperature Water Vapour Electrolysis", Int. J. Hydrogen Energy, vol. 7, No. 4, 1982, pp. 321-330.

(Continued)

*Primary Examiner* — Nicholas A Smith
(74) *Attorney, Agent, or Firm* — Oblon, Spivak, McClelland, Maier & Neustadt, L.L.P.

(57) ABSTRACT

An electrolyser including a stack of a plurality of elementary electrolysis cells, each cell including a cathode, an anode, and an electrolyte provided between the cathode and the anode. An interconnection plate is interposed between each anode of an elementary cell and a cathode of a following elementary cell, the interconnection plate being in electric contact with the anode and the cathode. A pneumatic fluid is to be brought into contact with the cathodes, and the electrolyser further includes a mechanism ensuring circulation of the pneumatic fluid in the electrolyser for heating it up before contacting the same with the cathodes.

11 Claims, 3 Drawing Sheets

(56) References Cited

OTHER PUBLICATIONS

U.S. Appl. No. 12/678,304, filed Mar. 16, 2010, Le Gallo.

J. Stephen Herring, et al., "Hydrogen Production Through High-Temperature Electrolysis in a Solid Oxide Cell", Nuclear Production of Hydrogen, Second Information Exchange Meeting Argonne, Illinois, USA, Nuclear Energy Agency Organisation for Economic Co-operation and Development, XP008090975, Oct. 2-3, 2003, pp. 183-200 with an additional page.

D.K. Ryland, et al., "Electrolytic hydrogen generation using CANDU nuclear reactors", International Journal of Energy Research, vol. 31, XP-002478071, May 21, 2007, pp. 1142-1155.

U.S. Appl. No. 13/583,099, filed Sep. 6, 2012, Perret.

* cited by examiner

HIGH TEMPERATURE ELECTROLYSER WITH TEMPERATURE HOMOGENISATION DEVICE

TECHNICAL FIELD AND PRIOR ART

The present invention relates to electrochemical reactors provided with a temperature homogenisation device, particularly electrolysers or fuel cells, and more particularly high temperature electrolysers.

An electrolyser comprises a plurality of elementary cells formed of a cathode and an anode separated by an electrolyte, the elementary cells being electrically connected in series by means of interconnection plates interposed, in general, between an anode of an elementary cell and a cathode of the following elementary cell. An anode-anode connection followed by a cathode-cathode connection is also possible. The interconnection plates are electrically conductive components formed of a metal plate. These plates moreover ensure the separation between the cathodic fluid circulating at an elementary cell from the anodic fluid circulating in a following elementary cell.

The anode and the cathode are made of porous materials in which the gases can flow.

For example, in the case of the electrolysis of water to produce hydrogen, water vapour circulates at the cathode where hydrogen is generated in gaseous form, and a draining gas circulates at the anode and collects the oxygen generated in gaseous form at the anode.

Generally speaking, it is aimed to reduce the electrical resistance of the electrolyser in order to improve its operation, particularly to limit its warming up and electrical losses by Joule effect.

However current electrolysers have a non negligible electrical resistance, so that the overall reaction at the level of the electrolyser is exothermic, whereas the electrochemical reaction at each cell is endothermic.

It is thus necessary to evacuate this heat in order to ensure a stationary operation of the electrolyser. The evacuation of the heat then takes place mainly through the gases coming out of the electrolyser. This heat is currently used for heating up the incoming gases by heat exchange in an external exchanger provided upstream of the electrolyser.

However, since the internal components of the electrolyser, particularly the elementary cells, are made at least partly of ceramic, they are highly sensitive to temperature gradients and are not capable of supporting a thermal shock greater than 50° C. This consequently implies that the temperature of the incoming gases is not less than that of the outgoing gases by more than 50° C.

Moreover, to ensure the longevity of the electrolyser and its correct operation, it is preferable to ensure the most uniform possible distribution of temperature within the electrolyser. Temperatures are then sought that do not vary by more than 10° C. throughout the electrolyser.

To avoid these thermal shocks as indicated previously, a heat exchanger is used upstream of the electrolyser as has been described in the document "Concepts and Design for scaling up high temperature water vapour electrolysis", W Doenits and R. Schmidberger, in *Int. J. Hydrogen Energy*, Vol. 7, No. 4, pp. 321-330, 1982.

However, on account of the inevitable heat losses between the output of the electrolyser and the input of the exchanger and the temperature difference of the exchanger, there is a difference of at least 50° C. between the temperature of the incoming gases and that of the outgoing gases. This thus imposes having an outgoing gas temperature above that required for the incoming gases.

However this temperature difference between the incoming and outgoing gases is unfavourable to the aim of a uniform temperature in the electrolyser.

Furthermore, this higher temperature is harmful to the mechanical strength of the cells and lowers the conversion efficiency.

This thus implies a choice of specific materials; beyond a temperature of 700° C., suitable materials are not very numerous and their cost price is high. Furthermore, they are more difficult to work and to assemble. For example, a superalloy especially adapted to high temperatures such as Haynes 230 is ten times more expensive than a stainless steel that can be used up to 500° C.

Moreover, since calories are recovered on the gases from the anode and the cathode, two exchangers with high temperature stage are required.

The presence of connections at high temperature between the electrolyser and the exchangers also raises the cost and the difficulties of intervening on and maintaining the exchangers. Finally, the overall installation is of increased volume and weight.

Consequently, it is an aim of the present invention to offer an electrochemical reactor having improved operation and longer lifetime.

It is also an aim of the present invention to offer an electrochemical reactor at lower cost price and an installation integrating the electrochemical reactor of reduced size.

DESCRIPTION OF THE INVENTION

The above mentioned aims are attained by an electrochemical reactor comprising a plurality of stacked elementary cells, connected by interconnection plates integrating channels for circulating the gases entering into the electrochemical reactor prior to their injection into the cathodes and/or the anodes.

In other words, the electrochemical reactor integrates internal heat exchangers formed directly between the elementary cells.

In the case of the electrolysis of water, incoming water vapour circulates in the interconnection plates before circulating in the cathodes; during this circulation it is heated by heat exchange with the gas circulating in the cathodes and with the anodes in contact with the interconnection plates.

The external exchangers may be simplified and made more compact.

It is also no longer necessary to have outgoing gases at a temperature above that required for the incoming gases. Temperature homogeneity within the electrochemical reactor is thus easier to attain, the operation of the electrochemical reactor is thus improved.

In the case of exothermic electrolysers, the fluidic circuit formed directly in the elementary cells thus makes it possible:
  to reduce the temperature of the interconnection plate by circulating incoming gases therein for a given operating temperature of the electrochemical cell, the gain in temperature may attain more than 50° C.,
  to lower the incoming temperature of the gases, down to temperatures below 600° C.,
  to limit, with regard to the hydrogen production system, the zone known as the "hot" zone, in other words above 600° C., to the inside the electrolyser,
  to reduce the cost of external exchangers, their price may reduced fivefold, or even tenfold, to improve the temperature homogeneity within the electrolyser, the temperature difference between two points of an elementary electrochemical cell may be decreased below 10° C.

Consequently, this circuit integrated in the cells makes it possible to heat efficiently and directly the incoming gas (or gases) from internal losses from the electrolyser and to homogenise their temperature.

In the case of endothermic electrolysers with allothermic operation, the fluidic circuit formed directly in the interconnection plates makes it possible to heat the electrolyser by the incoming gases and avoid the implementation of a heat conveyor and a specific circuit to heat the gas inside the electrolyser.

The main subject-matter of the present invention is then an electrochemical reactor comprising a stack of a plurality of elementary electrolysis cells, each cell being formed of a cathode, an anode and an electrolyte provided between the cathode and the anode, an interconnection plate being interposed between two elementary cells, said interconnection plate being in electric contact with an electrode of an elementary cell and an electrode of a following elementary cell, said electrochemical reactor also comprising means capable of ensuring the circulation of at least one pneumatic fluid to be brought into contact with the cathodes and/or the anodes in the electrochemical reactor to heat it before contacting the same with the cathodes and/or the anodes.

Said circulation means comprise for example at least one conduit for the circulation of the pneumatic fluid so that heat exchanges between the pneumatic fluid and the cathodes and/or the anodes take place.

The conduit may be formed in the interconnection plate, a first end of said conduit being connected to a supply of pneumatic fluid and a second end bringing the heated pneumatic fluid into contact with one or the other of the electrodes in contact with the interconnection plate.

In an alternative, the conduit is interposed between the interconnection plate and one and/or the other of the electrodes.

In another embodiment example, the circulation means comprise a first conduit for the circulation of a pneumatic fluid to be brought into contact with one of the two electrodes, and a second conduit for the circulation of a pneumatic fluid to be brought into contact with the other electrode.

The first and second conduits may be formed in the interconnection plate, or the first conduit may be interposed between the interconnection plate and one of the electrodes and the second conduit may be interposed between the interconnection plate and the other electrode.

In the case where one at least of the two electrodes is a cathode, the pneumatic fluid to be brought into contact with the cathode is water vapour, the reactor then carrying out the electrolysis of water to generate hydrogen.

The reactor is, for example intended to operate at high temperature, advantageously above 900° C.

The subject-matter of the present invention is also an electrolysis installation comprising an electrolyser according to the present invention and a heat exchanger upstream of the electrochemical reactor wherein circulate in a separate manner the incoming pneumatic fluids and the outgoing pneumatic fluids, so as to heat the incoming pneumatic fluids from the outgoing pneumatic fluids.

Another subject-matter of the present invention is a method for electrolysing a pneumatic fluid using an electrochemical reactor according to the present invention, comprising the steps of:

a) circulation of the pneumatic fluid between an electrode of an elementary cell and an electrode of an adjacent elementary cell without contact with these for heating said pneumatic fluid, b) injection of the heated pneumatic fluid onto one and/or the other of the electrodes.

Provision may be made, during step a), for the circulation, along separate streams, of a pneumatic fluid to be brought into contact with one of the electrodes and a pneumatic fluid to be brought into contact with the other electrode and, during step b), the injection of these pneumatic fluids onto one and the other of the electrodes respectively.

BRIEF DESCRIPTION OF DRAWINGS

The present invention will be better understood on reading the description that follows and by referring to the appended drawings, in which.

DETAILED DESCRIPTION OF SPECIFIC EMBODIMENTS

In the following description, an electrolyser of water for producing hydrogen will be described by way of example. However, the invention applies to any other electrochemical reactor such as a fuel cell.

Figure 1:
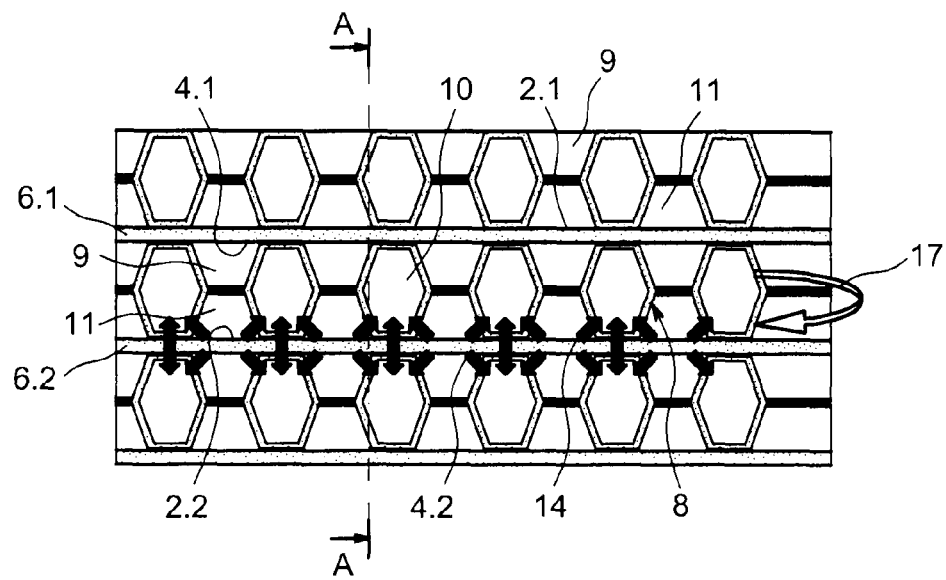
FIG. 1 is a side view of an example of embodiment of an electrochemical reactor according to the present invention.

An example of embodiment of an electrolyser according to the present invention comprising a plurality of stacked elementary cells C1, C2, etc., may be seen in FIG. 1.

Each elementary cell comprises an electrolyte provided between a cathode and an anode.

In the remainder of the description, we will describe in detail the cells C1 and C2 and their interface.

The cell C1 comprises a cathode 2.1 and an anode 4.1 between which is provided an electrolyte 6.1, for example solid, generally of 100 µm thickness.

The cell C2 comprises a cathode 2.2 and an anode 4.2 between which is provided an electrolyte 6.2.

The cathodes 2.1, 2.2 and the anodes 4.1, 4.2 are made of porous material and have for example a thickness of 40 µm.

The anode 4.1 of the cell C1 is electrically connected to the cathode 2.2 of the cell C2 by an interconnection plate 8 coming into contact with the anode 4.1 and the cathode 2.2. Moreover, it enables the electrical supply of the anode 4.1 and the cathode 2.2.

An interconnection plate 8 is interposed between two elementary cells. In the example represented, it is interposed between an anode of an elementary cell and the cathode of the adjacent cell. But it could be provided that they are interposed between two anodes or two cathodes.

Figure 2:
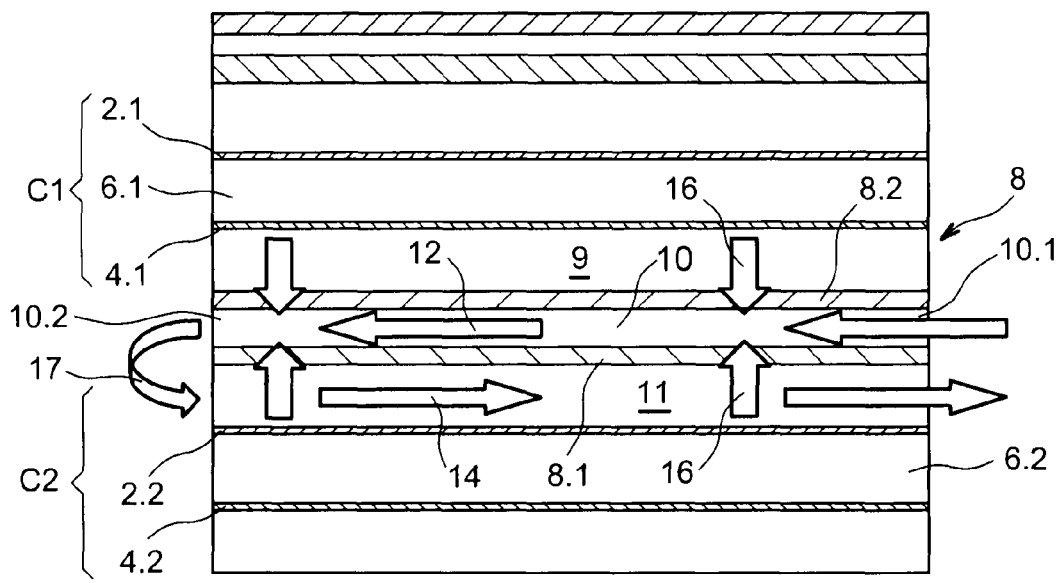
FIG. 2 is a sectional view of the electrochemical reactor of FIG. 1 along a plane A-A.

The interconnection plate 8 defines with the adjacent anode and the cathode channels for the circulation of fluids. They define anodic compartments 9 dedicated to the circulation of gases at the anode and cathodic compartments 11 dedicated to the circulation of gases at the cathode, this being particularly visible in FIG. 2.

According to the present invention, the interconnection plate 8 further comprises at least one conduit 10 connected by a first end 10.1 to a supply of pneumatic fluid intended to undergo a reduction. In the example considered, it is water vapour, and to a second end 10.2 of the cathodic compartment.

This conduit advantageously has the shape of a pipe with meanders to increase the heat exchange surface.

In the example represented, the interconnection plate comprises a plurality of conduits 10 and a plurality of anodic and cathodic compartments. Advantageously, the conduit 10 and the compartments have honeycomb-shaped hexagonal sections, which makes it possible to increase the density of the compartments 9, 11 and the conduits 10.

The arrows 12 represent the "cold" water vapour entering into the electrolyser and the arrows 14 represent the heated water vapour circulating in the cathodic compartment 11.

The arrows 16 represent the transfers of calories from the cathode 2.2 and the anode 4.1 to the interconnection plate, or more precisely to the "cold" water vapour.

The arrows 17 symbolise the flow of the heated water vapour from the conduit 10 to the cathodic compartment 11.

We will now explain how the present invention works.

Water vapour, if necessary heated beforehand, penetrates into the conduit 10; while it moves within the conduit 10, it is heated by heat exchange with the cathode and the anode lining the interconnection plate 8.

This vapour heated to a temperature close to that of the cell C1 then penetrates into the cathodic compartment 1, wherein it undergoes a reduction while entering into contact with the cathode 2.2; hydrogen is then generated according to the reaction:

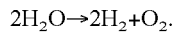

$2H_2O \rightarrow 2H_2 + O_2$.

A heat exchanger is advantageously provided upstream of the electrolyser for heating the incoming fluid or fluids from the outgoing fluids, however this may advantageously be simpler and less bulky than those used in the prior art, indeed it does not need to have a high temperature stage.

It could be provided that the conduit 10 is connected at the input to a source of draining gas intended to be circulated in the anodic compartment 9, and at the output to the anodic compartment 9.

Figure 3:
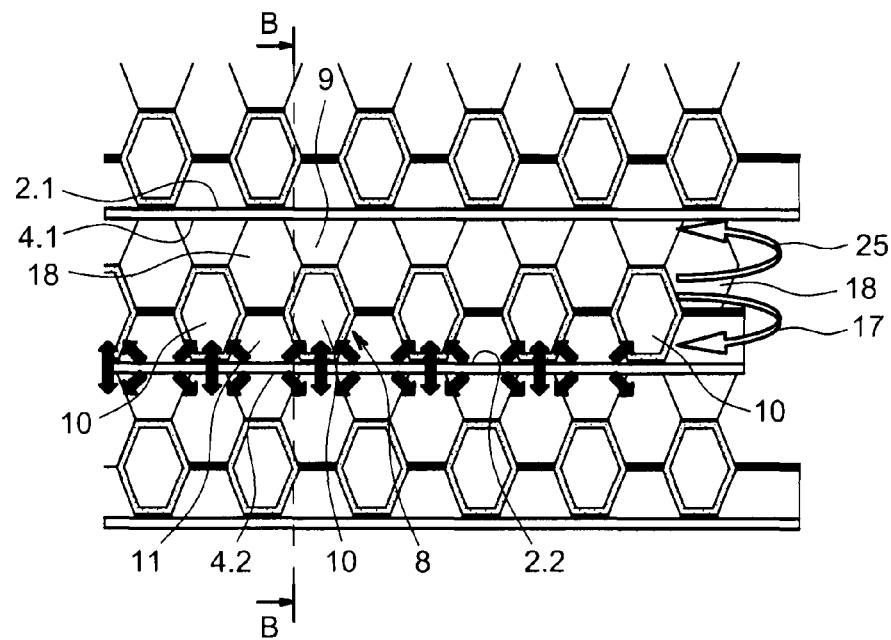
FIG. 3 is a side view of another example of embodiment of an electrochemical reactor according to the present invention.
Figure 4:
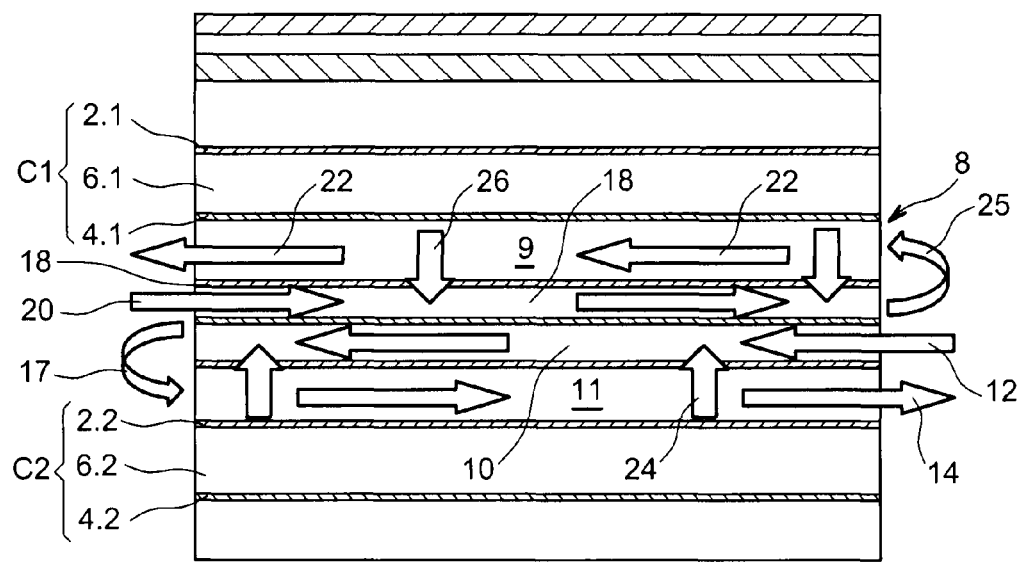
FIG. 4 is a sectional view of the electrochemical reactor of FIG. 3 along a plane B-B.

In FIGS. 3 and 4 may be seen another example of embodiment of an electrolyser according to the invention wherein an additional conduit 18 is provided along the conduit 10 and intended to receive a draining gas circulating in the anodic compartment 9.

The arrows 20 represent the "cold" draining gas entering into the electrolyser and the arrows 22 represent the heated draining gas circulating in the anodic compartment 9.

The arrows 24 represent the transfers of calories from the cathode 2.2 to the interconnection plate, or more precisely the "cold" water vapour, and the arrows 26 represent the transfers of calories from the anode 4.1 to the interconnection plate, more precisely to the draining gas.

The arrow 25 symbolises the flow of the draining gas from the conduit 18 to the anodic compartment 9. This flow is not in any case necessary, this gas could be used in other zones or even outside of the reactor.

The operation of this other example of electrolyser according to the present invention will now be explained.

Water vapour, if necessary heated beforehand, penetrates into the conduit 10; while it moves within the conduit 10, it is heated by heat exchange with the cathode lining the interconnection plate 8.

This vapour heated to a temperature close to that of the cell C1 then penetrates into the cathodic compartment 11, wherein it undergoes a reduction; hydrogen is then generated.

The draining gas, if necessary heated beforehand, penetrates into the conduit 18, while it moves within the conduit 18 it is heated by heat exchange with the anode lining the interconnection plate 8.

This gas, heated to a temperature close to that of the cell C1, then penetrates into the anodic compartment 9, and carries away the oxygen generated at the anode.

In the examples of FIGS. 1 to 4, the interconnection plates are solid and the channels are formed directly therein.

Figure 5:
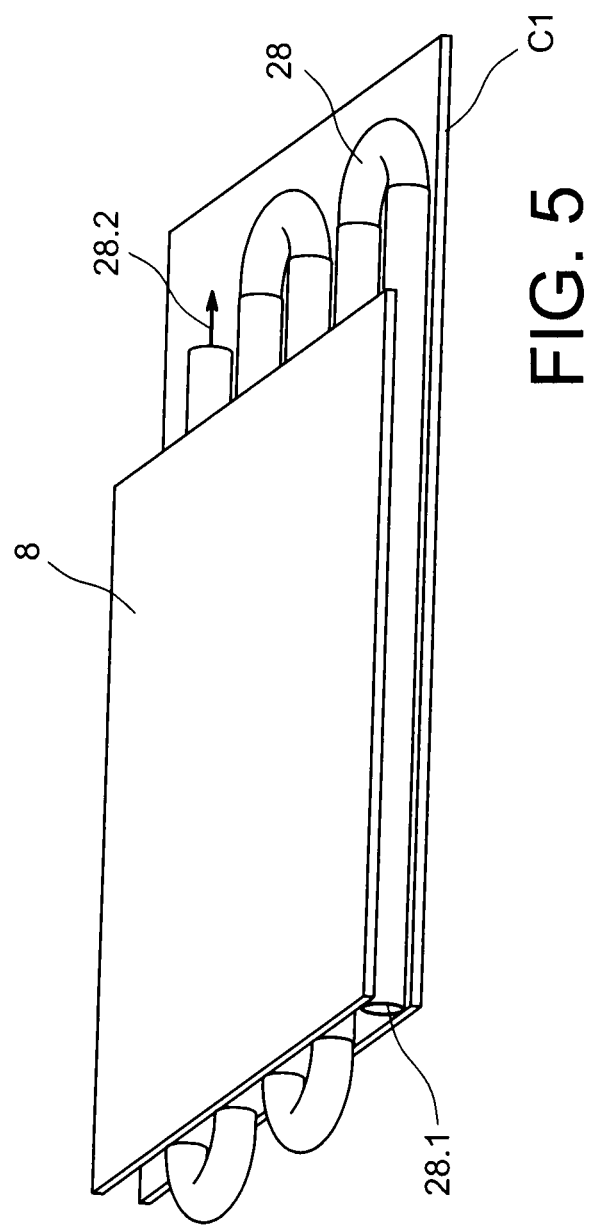
FIG. 5 is a schematic representation in perspective of an example of heat exchanger that may be used in the electrochemical reactors according to the present invention.

However, as may be seen in FIG. 5 representing another example of embodiment of an integrated heat exchanger according to the invention, the exchanger is provided on the interconnection plate. An electrochemical cell C1, a pipe with meanders 28 formed of a hollow tube, said pipe with meanders being in contact with an electrode of the cell, and the interconnection plate 8, are represented.

The pneumatic fluid penetrates into the pipe with meanders 28 by one end 28.1, circulates in the pipe with meanders 28 before flowing out of it by one end 28.2 and spreading on the electrode.

If this electrode is the cathode 2.1, the fluid is water vapour.

The pipe with meanders is advantageously made of electrically conductive material in order to contribute to the electrical connection between the cathode of the cell C1 and the interconnection plate. It is recalled that the interconnection plate also serves to separate the cathodic fluid of an elementary cell from an anodic fluid of an adjacent elementary cell.

In a symmetrical manner on the other face of the interconnection plate, a pipe with meanders (not represented) is interposed between the anode and the interconnection plate.

The present invention thus consists in providing means capable of ensuring a heating of a part at least of the gases entering into the electrolyser before contacting the same with the cathode or the anode.

The dimensions of the heat exchanger circuits are of the same order of magnitude as those of the cathodic and/or anodic circuits, since it is the same fluids and the same flow rates that circulate in these different circuits.

The operation of an electrochemical reactor is based on the deployment of surfaces in order to maximise the surfaces of the electrodes to increase the reaction yield. A heat exchanger also requires a high exchange surface to be efficient. Consequently, the increase in reaction surfaces makes it possible to increase the heat exchange surfaces.

Thanks to the invention, a part of the heat exchanger is integrated directly in the electrolyser, in particular the hottest part of it. The zone receiving fluids at high temperature is then limited to the electrolyser, the quantity of material to form the parts to be brought into contact with the fluids at high temperature is thus reduced. The cost of the material may thus be reduced fivefold, even tenfold, compared to the installations of the prior art.

The temperature differences in the electrolyser are also reduced. Moreover, since the distance of heat transport from the hot source (the cell of the reactor) to the exchanger is reduced, temperature differences less than 50° C. may be obtained.

For exothermic reactors, the interconnection plate is at a lower temperature than that of the cell, by at least 50° C.

Corrosion is thus reduced, and consequently oxidation thereof. The electrical resistance of the interconnection plates thus increases less quickly, which reduces the losses by Joule effect over time.

The interconnection plate is for example made of iron or nickel, and contains elements such as chromium. This chromium tends to pass into the gases and pollute the electrodes. Yet, thanks to the present invention, on account of the lowering of the temperature, there is a reduction in the volatilisation of the alloying elements and thus a lowering of the emissions of pollutants that contaminate the electrodes of the cell; it should be noted that these emissions increase in an exponential manner with the temperature according to the Arrhenius Law.

Thanks to the present invention, the lifetime of the stack of cells is generally increased on account of the drop in operating temperature. P. Batfalsky in *Journal of Power Sources* 155, 2006, pp. 128-13 shows in fact that the lifetime of an electrolyser of the prior art may be extended tenfold, even twentyfold, by lowering the temperature from 800° C. to 700° C.

Moreover, the difference between the minimum and maximum temperatures of the cell may be reduced to values less than ten or so degrees, the operation of the electrolyser is thus improved.

The input and output temperature of the gases could be lower, which can make it possible to connect the electrolyser to circuits at lower temperature below 600° C., only inside the electrolyser being at high temperature, which makes it possible to use standard and less costly valves and instrumentation.

The exchanger according to the invention and the junction circuits to the electrolyser may moreover be of simpler and cheaper design. The heat losses are also lower. This exchanger operates within a less restrictive temperature range with regard to the material and the overall efficiency of the heat exchange.

For exothermic reactors: the invention enables the heating of the actual inside of the electrolyser on account of the presence of the heat exchanger inside the electrolyser. The rise in the temperature of the gases at the input is limited and the electrolyser offers improved efficiency.

The invention claimed is:

1. An electrochemical reactor comprising:
   a stack of a plurality of elementary electrolysis cells, each cell being formed of:
      a cathode,
      an anode, and
      an electrolyte provided between the cathode and the anode;
   an interconnection plate interposed between two elementary cells, the interconnection plate being in electric contact with an electrode of an elementary cell and an electrode of a following elementary cell;
   means for ensuring circulation of at least one pneumatic fluid to be brought into contact with the cathodes and/or the anodes in the electrochemical reactor for heating it up before contacting the same with the cathodes and/or the anodes, the means for ensuring circulation including conduits, in which the pneumatic fluid circulates, in heat transfer communication with the cathodes and/or anodes, but not being in fluid communication with the cathodes and/or anodes along a length of the electrochemical reactor from a first end to a second end, the conduits are only in fluid communication after passing the second end of one of the conduits, the conduits enabling heating of the fluid extending from one side to another side of the interconnection plate between the elementary cells, the conduits having the first end situated on one side of the interconnection plate, the first end being connected to a supply delivering the pneumatic fluid, and the second end situated on another side of the interconnection plate, the second end bringing the heated fluid into contact with the electrode of the elementary cell or the electrode of the following elementary cell.

2. An electrochemical reactor according to claim 1, wherein the conduits are formed in the interconnection plate.

3. An electrochemical reactor according to claim 1, wherein the conduits are interposed between the interconnection plate and the electrode of the elementary cell or the electrode of the following elementary cell.

4. An electrochemical reactor according to claim 1, wherein the means for ensuring circulation comprises a first conduit for circulation of a first pneumatic fluid to be brought into contact with one of the electrode of the elementary cell or the electrode of the following elementary cell and a second conduit for circulation of a second pneumatic fluid to be brought into contact with the other of the electrode of the elementary cell or the electrode of the following elementary cell.

5. An electrochemical reactor according to claim 4, wherein the first and second conduits are formed in the interconnection plate.

6. An electrochemical reactor according to claim 4, wherein the first conduit is interposed between the interconnection plate and one of the electrodes and the second conduit is interposed between the interconnection plate and the other electrode.

7. An electrochemical reactor according to claim 1, wherein, when at least one of the two electrodes is a cathode, the pneumatic fluid to be brought into contact with the cathode is water vapour.

8. An electrochemical reactor according to claim 1, to operate at a temperature above 900° C.

9. An electrolysis installation comprising:
   an electrolyser according to claim 1; and
   a heat exchanger upstream of the electrochemical reactor, in which incoming pneumatic fluids and outgoing pneumatic fluids circulate in a separate manner, so as to heat up the incoming pneumatic fluids from the outgoing pneumatic fluids.

10. A method for electrolysing a pneumatic fluid, said method comprising:
   obtaining an electrochemical reactor including a stack of a plurality of elementary electrolysis cells, each cell including a cathode, an anode, and an electrolyte provided between the cathode and the anode, an interconnection plate being interposed between two elementary cells, the interconnection plate being in electric contact with an electrode of an elementary cell and an electrode of a following elementary cell, the electrochemical reactor further including means for ensuring circulation of at least one pneumatic fluid to be brought into contact with the cathodes and/or the anodes in the electrochemical reactor for heating it up before contacting the same with the cathodes and/or the anodes, wherein the means for ensuring circulation includes conduits, in which the pneumatic fluid circulates, in heat transfer communication with the cathodes and/or anodes, but not being in fluid communication with the cathodes and/or anodes along a length of the electrochemical reactor from a first end to a second end, the conduits are only in fluid communication after passing the second end of one of the conduits, the conduits enabling heating of the fluid extending from one side to another side of the interconnection plate between the elementary cells, the conduits having the first end situated on one side of the interconnection plate, the first end being connected to a supply delivering the pneumatic fluid, and the second end situated on another side of the interconnection plate, the second end bringing the heated fluid into contact with the electrode of the elementary cell or the electrode of the following elementary cell;

circulating, with the means for ensuring circulation, the pneumatic fluid between an electrode of an elementary cell and an electrode of an adjacent elementary cell without contact with them to heat up the pneumatic fluid; and injecting the heated pneumatic fluid onto one and/or the other of the electrodes.

11. An electrolysis method according to claim 10, wherein the circulating provides for circulation along separate streams of a first pneumatic fluid to be brought into contact with one of the electrodes and a second pneumatic fluid to be brought into contact with the other electrode and the injecting provides for injection of the pneumatic fluids onto one and the other of the electrodes respectively.

* * * * *